Patented July 7, 1925.

1,545,272

UNITED STATES PATENT OFFICE.

HENRY J. NUNAN, SR., OF ARDMORE, PENNSYLVANIA.

POLISH.

No Drawing. Application filed February 2, 1923. Serial No. 616,595.

*To all whom it may concern:*

Be it known that I, HENRY J. NUNAN, Sr., a citizen of the United States, residing at Ardmore, in the county of Montgomery and State of Pennsylvania, have invented new and useful Improvements in a Polish, of which the following is a specification.

My invention relates to new and useful improvements in a polish, and has for its primary object to provide a composition of this character which will produce a glossy surface on the varnish and act as a preservative.

The polish is made from butter of antimony, linseed oil, Chinese wood oil, citronella, cedar oil, turpentine, muriatic acid, oxalic acid, alcohol and water.

In preparing the composition I prefer to use the ingredients in about the following proportions—viz, four ounces of butter of antimony, one quart of raw linseed oil, one pint of Chinese wood oil, four ounces of citronella, four ounces of cedar oil, one pint of turpentine, seven ounces of muriatic acid and seven ounces of oxalic acid and one quart of alcohol.

These ingredients are mixed with a quantity of water sufficient to weaken the stronger ingredients so as to be harmless to the person using the same. The polish may be applied by pouring some upon a cloth and rubbing over the varnish or it may be poured upon the varnish surface and rubbed in with a suitable cloth after which it should be wiped dry with a clean cloth and rubbed until a glossy finish is produced.

This polish besides feeding the varnish and retaining it practically in a new condition acts as a repellent to dirt or other foreign matter if the surface is in an upright position but such foreign matter will not stick to the treated surface even though the latter is in a horizontal position so that said foreign matter may be readily wiped from the surface.

Having thus fully described my invention, what I claim as new and useful is:—

A polish consisting of four ounces of butter of antimony, one quart of raw linseed oil, one quart of Chinese wood oil, four ounces of citronella, four ounces of cedar oil, one pint of turpentine, seven ounces of muriatic acid, seven ounces of oxalic acid and one quart of alcohol.

In testimony whereof, I have hereunto affixed my signature.

HENRY J. NUNAN, SR.